(12) United States Patent
Rutherford (10) Patent No.: US 10,578,345 B2
(45) Date of Patent: Mar. 3, 2020

(54) HEAT TRANSFER AND HYDRONIC SYSTEMS

(71) Applicant: BILLYBOB CORPORATION, Winnipeg (CA)

(72) Inventor: Robert G. Rutherford, Mississauga (CA)

(73) Assignee: BILLYBOB CORPORATION, Winnipeg (CA)

( * ) Notice: Subject to any disclaimer, the term of this patent is extended or adjusted under 35 U.S.C. 154(b) by 0 days.

(21) Appl. No.: 16/085,383

(22) PCT Filed: Jan. 29, 2018

(86) PCT No.: PCT/IB2018/050536
§ 371 (c)(1),
(2) Date: Sep. 14, 2018

(87) PCT Pub. No.: WO2018/138698
PCT Pub. Date: Aug. 2, 2018

(65) Prior Publication Data
US 2019/0101311 A1   Apr. 4, 2019

Related U.S. Application Data

(60) Provisional application No. 62/451,733, filed on Jan. 29, 2017.

(51) Int. Cl.
*F25B 7/00* (2006.01)
*F25B 25/00* (2006.01)
(Continued)

(52) U.S. Cl.
CPC .............. *F25B 29/003* (2013.01); *F24D 3/18* (2013.01); *F24F 3/08* (2013.01); *F24F 13/30* (2013.01);
(Continued)

(58) Field of Classification Search
CPC .... F25B 7/00; F25B 2339/047; F25B 29/003; F25B 25/005; Y02B 30/12; Y02B 30/125; F24F 3/08; F24F 13/30
See application file for complete search history.

(56) References Cited

U.S. PATENT DOCUMENTS

2007/0295477 A1   12/2007   Mueller et al.
2008/0264617 A1*  10/2008   Martin ................. F28D 7/0066
                                                                165/154

(Continued)

OTHER PUBLICATIONS

International Search Report and Written Opinion with regard to PCT/IB2018/050536 dated Apr. 16, 2018.

*Primary Examiner* — Edward F Landrum
*Assistant Examiner* — Daniel C Comings
(74) *Attorney, Agent, or Firm* — BCF LLP (57) ABSTRACT

A heat transfer system comprises a first fluid storage tank fluidly connectable to a first fluid circuit for heat exchange between the first fluid circuit and a first fluid in the fluid storage tank, a first heat exchanger positioned for heat exchange with the first fluid, and a second heat exchanger fluidly connected to the first heat exchanger via a refrigerant circuit for heat exchange with the first heat exchanger. The refrigerant circuit includes a refrigerant compressor module and an expansion valve for circulating a refrigerant therethrough for heat exchange between the first and second heat exchangers. A hydronic system is also described.

16 Claims, 6 Drawing Sheets

(51) Int. Cl.
*F25B 29/00* (2006.01)
*F24F 13/30* (2006.01)
*F24F 3/08* (2006.01)
*F24D 3/18* (2006.01)

(52) U.S. Cl.
CPC .............. *F25B 7/00* (2013.01); *F25B 25/005* (2013.01); *F25B 2339/047* (2013.01); *Y02B 30/12* (2013.01)

(56) References Cited

U.S. PATENT DOCUMENTS

| | | |
|---|---|---|
| 2011/0265502 A1 | 11/2011 | Maxwell |
| 2011/0296861 A1* | 12/2011 | Honda ...................... F24D 3/08 62/238.7 |
| 2013/0091874 A1 | 4/2013 | Sillato et al. |
| 2013/0219945 A1* | 8/2013 | Koge ...................... F25B 13/00 62/324.6 |
| 2014/0165626 A1* | 6/2014 | Van Horn .............. C09K 5/044 62/79 |
| 2016/0327284 A1* | 11/2016 | Castaneda Viveros ...................... F25B 13/00 |

* cited by examiner

HEAT TRANSFER AND HYDRONIC SYSTEMS

CROSS-REFERENCE

The present application claims priority to U.S. Provisional Patent Application No. 62/451,733, entitled *"Heat Transfer System"*, filed Jan. 29, 2017, the entirety of which is incorporated herein by reference.

TECHNICAL FIELD

The embodiments disclosed herein relate generally to heat transfer and hydronic systems, and particularly to heat transfer systems for heating, ventilation, and air conditioning applications.

BACKGROUND

Numerous heat transfer systems for providing heating, ventilation, and air conditioning ("HVAC") are known.

HVAC systems are often used to heat, ventilate, and air condition occupied, as well as mechanical, spaces in various types of buildings. For example, such systems may be implemented to serve a residential or commercial low-rise and high-rise, healthcare, and government buildings. Examples of mechanical spaces that may be served (i.e. heated and/or cooled) by such HVAC systems may include electronics rooms, such as computer server rooms, and may include mechanical rooms, such as boiler rooms and pumping stations.

For example, U.S. Publication No. 2011/0265502 A1 ("Maxwell") describes a high-efficiency heat pump that includes a frame, as well as a first circuit, a first compressor, a condenser heat exchanger, a first electronic expansion valve, an evaporator heat exchanger, and a controller.

In an aspect, the systems described in Maxwell may include a relatively large number of components. Generally, the larger the number of components a system has, the more expensive that system may be to manufacture, install, and maintain.

In another aspect, such systems may be less suitable, and possibly not suitable, for some applications requiring such systems to satisfy some particular heating and cooling load profiles. In one particular example, such systems may be less suitable for serving spaces that have high heating and/or cooling loads for relatively short periods of time, as well as relatively low heating and cooling loads for other relatively longer periods of time.

Such heating and cooling load profiles may cause such existing systems to experience relatively high cycling of compressors (that is, compressors switching between operating and being shut off), for example, in order to satisfy part heating and part cooling loads.

In an aspect, relatively higher compressor cycling may result in lower operating efficiencies of the systems, higher electrical loads, and reduced life of the compressors. In other aspects, relatively higher compressor cycling may result in higher operating noise levels and tonal sound changes that may be audible to and irritating to occupants of spaces served by systems comprising these compressors. In yet another aspect, higher compressor cycling may result in reduced compressor lifespans.

Various add-ons and options for refrigerant compressors, such as hot gas bypass systems, Variable Frequency Drives for slowing down a refrigerant compressor at part loads, and other add-ons, may be used for refrigerant compressors in existing HVAC systems to reduce cycling of those compressors or to increase their operating efficiencies. However, there are also drawbacks to implementing such add-ons.

For example, some add-ons may permit a refrigerant compressor in a given existing HVAC system to run at part loads (as opposed to being locked out of operation due to low refrigerant pressure), but may cause that compressor to run less efficiently. Other add-ons may increase a refrigerant compressor's efficiency in some operating conditions, but may add to the cost of manufacturing, implementing, maintaining, and eventually replacing that compressor and the HVAC system in which it may be implemented. In yet another aspect, refrigerant compressors implemented with such add-ons and options may nonetheless operate most efficiently at their design operating conditions (for example, at cooling loads that are near the nominal capacity of the compressors).

Some HVAC systems have been implemented in attempts to mitigate some of the mentioned drawbacks. However, such systems may also have drawbacks. An example of such a system is commonly referred to as a Variable Refrigerant Flow ("VRF") system.

For example, U.S. Publication No. 2013/0091874 ("Sillato et al.") describes a VRF system having a compressor and one or a plurality of evaporators. The suction at one or the plurality of evaporators for the input to the compressor is monitored and generally corresponds to the minimum pressure of the refrigerant. The pressure is associated with a temperature and is controlled to always be above the dew point temperature of the room served by that system.

VRF systems may include indoor VRF units to air condition spaces, and outdoor VRF units to serve the indoor VRF units. VRF systems use refrigerant tubing to connect the indoor VRF units with the outdoor units, and require the compressor(s) of the systems to run in order to provide heating or cooling. Where a VRF system is implemented to, for example, air condition offices in a commercial office building, the system may include a relatively large amount of refrigerant piping.

In one aspect, refrigerant piping may be expensive to manufacture, purchase, install and maintain, relative to, for example, piping for water or glycol. The relatively large costs may be associated with the fact that refrigerant systems operate at relatively large (for example, in comparison to hydronic heating and air conditioning systems) refrigerant pressures requiring relatively stronger construction of the refrigerant piping, which, in turn, may result in larger manufacturing and installation costs.

For example, a typical refrigeration system may operate at about 600 pounds per square inch ("PSI") (about 4137 kilopascals, or "kPa") refrigerant pressures. In comparison, a typical water or glycol piping system may operate at, for example, 50 PSI (about 345 kPa).

In another aspect, in many jurisdictions installation and testing of refrigerant piping may require specialized technicians.

In yet another aspect, where a leak develops in refrigerant piping, the leak may be relatively difficult and expensive to identify and repair, compared to, for example, water or glycol leaks in water or glycol piping. In another aspect, even a relatively small refrigerant piping leak may cause sufficient leakage of the refrigerant to render a VRF system inoperable due to a loss of the refrigerant in a relatively short period of time.

SUMMARY

In view of the drawbacks of existing heat transfer systems, it may be desirable to provide a heat transfer system that may be suitable for a plurality of applications, including HVAC and refrigeration applications, that may overcome at least some of the drawbacks of existing systems.

In an aspect, it may be desirable to provide a heat transfer system that may require relatively small amounts of refrigerant piping when implemented in some applications, such as some residential or commercial building heating and air conditioning applications.

In another aspect, it may be desirable to provide a heat transfer system that may provide for, in some applications and modes of operation, reduced cycling of compressors. In yet another aspect, it may be desirable to provide a heat transfer system that may provide for, in some applications and modes of operation, reduced run times of refrigerant compressors.

In another aspect, it may be desirable to provide a heat transfer system that may be particularly suitable for some heat transfer applications having relatively large peak cooling loads in combination with relatively frequent and relatively low part cooling loads, such as part cooling loads that are about 30% of peak cooling loads. In a more particular aspect, it may be desirable to provide a heat transfer system that may experience relatively less frequent compressor operation when serving such part cooling loads in some applications.

In a further aspect, it may be desirable to provide a heat transfer system that may be implemented to satisfy a cooling load and a heating load simultaneously in some applications, and may be operable to satisfy some heating loads without operating a refrigerant compressor and instead by using an alternative heat source, such as a boiler for example.

In a more particular aspect, it may be desirable to provide a heat transfer system for HVAC applications, such as heating ventilating and air conditioning buildings such as low-rise and high-rise residential, commercial, healthcare, and government buildings that may be operable to provide dehumidification of air with reheat of this air, the reheat being provided by a non-refrigerant fluid heat exchanger.

In an aspect, the present technology provides a heat transfer system, comprising: a refrigeration circuit including a first refrigerant conduit, a second refrigerant conduit, a refrigerant compressor module, and an expansion valve, the first refrigerant conduit and the second refrigerant conduit being fluidly interconnected via the refrigerant compressor module and the expansion valve for circulating a refrigerant through the first refrigerant conduit and the second refrigerant conduit by the refrigerant compressor module via the expansion valve for heat exchange between the first refrigerant conduit and the second refrigerant conduit; a first fluid storage tank fillable with a first fluid and being fluidly connectable to a first fluid circuit for circulating the first fluid between the first fluid circuit and the first fluid storage tank for heat exchange between the first fluid circuit and the first fluid; a first heat exchanger that includes a first heat exchange surface and the first refrigerant conduit, the first heat exchange surface being in fluid communication with the first fluid when the heat transfer system is in use, the first refrigerant conduit being positioned for heat exchange with the first heat exchange surface; and a second heat exchanger that includes a second heat exchange surface that is fluidly connectable to a second fluid circuit for heat exchange with the second fluid circuit, the second heat exchanger including the second refrigerant conduit, the second refrigerant conduit being positioned for heat exchange with the second heat exchange surface.

In some implementations, the first heat exchanger is disposed inside the first fluid storage tank.

In some implementations, the heat transfer system further includes a second fluid storage tank fillable with a second fluid and fluidly connectable to the second fluid circuit for circulating the second fluid between the second fluid circuit and the second fluid storage tank for heat exchange between the second fluid circuit and the second fluid, and the second heat exchange surface being in fluid communication with the second fluid when the heat transfer system is in use for heat exchange with the second fluid.

In some implementations, the second heat exchanger is disposed inside the second fluid storage tank.

In some implementations, the second heat exchanger includes a heat transfer conduit fluidly connectable to a third fluid circuit for circulating a third fluid between the heat transfer conduit and the third fluid circuit for heat exchange between the heat transfer conduit and the third fluid circuit when the heat transfer system is in use, the heat transfer conduit being positioned for heat exchange with the second refrigerant conduit.

In some implementations, the heat transfer conduit is fluidly separated from the second fluid storage tank.

In some implementations, the heat transfer system further includes the third fluid circuit and the third fluid circuit includes at least one of a heat sink and a heat source.

In some implementations, the heat transfer conduit is disposed inside the second refrigerant conduit.

In some implementations, the heat transfer conduit is disposed coaxially with the second refrigerant conduit.

In some implementations, the heat transfer conduit is connected along at least a portion of its length to the second refrigerant conduit.

In some implementations, the heat transfer conduit and the second refrigerant conduit are arranged such that a portion of the heat transfer conduit and a portion of the second refrigerant conduit are in contact with the second fluid in the second fluid storage tank when the heat transfer system is in use.

In some implementations, the first fluid storage tank is a chilled fluid storage tank, the second fluid storage tank is a heated fluid storage tank, and the refrigerant compressor module in combination with the expansion valve is operable to transfer heat from the chilled fluid storage tank to the heated fluid storage tank.

In some implementations, the heat transfer system further includes a base and the refrigerant compressor module and the first fluid storage tank are disposed on the base.

In some implementations, the heat transfer system further includes an enclosure and the refrigerant compressor module and the first fluid storage tank are disposed inside the enclosure.

In some implementations, the heat transfer system further includes a base and the refrigerant compressor module, the first fluid storage tank, and the second fluid storage tank are disposed on the base.

In some implementations, the heat transfer system further includes an enclosure and the refrigerant compressor module, the first fluid storage tank, and the second fluid storage tank are disposed inside the enclosure.

In some implementations, the heat transfer system further includes an expansion tank fluidly connected to the first fluid storage tank so as to absorb expansion of a given volume of the first fluid over a given temperature rise of the first fluid when the heat transfer system is in use.

In some implementations, the first fluid storage tank is sized to satisfy a first cooling load served by the first fluid circuit for a first design period of time during which the refrigerant compressor module is off and during which the first fluid in the first fluid storage tank is within a design temperature range, by supplying the first fluid in the first fluid storage tank to the first fluid circuit.

In some implementations, the design temperature range is a range of temperatures between a first design temperature and a second design temperature that is higher than the first design temperature, the refrigerant compressor module includes at least one refrigerant compressor, and the at least one refrigerant compressor is sized to cool substantially all of the first fluid in the first fluid storage tank, while the first fluid circuit is off, from the second design temperature to the first design temperature in a second design period of time.

In some implementations, the first design temperature is between 45 degrees Fahrenheit ("F.") (7.2 degrees C.) and 50 F (10.0 degrees C.), and the second design temperature is between 55 F (12.8 degrees C.) and 60 F (15.6 degrees C.).

In some implementations, the second design period of time is at least five minutes.

In some implementations, the second design period of time is between five minutes and ten minutes.

In some implementations, the first cooling load is in magnitude between 30% and 40% of a design cooling load of the first fluid circuit.

In some implementations, the refrigerant compressor module is sized to continuously satisfy the design cooling load at design operating conditions of the first fluid circuit.

In some implementations, the first fluid storage tank is sized in a range of five to fifteen gallons per nominal ton of cooling capacity of the refrigerant compressor module.

In some implementations, the refrigerant compressor module includes a plurality of refrigerant compressors.

In another aspect, the present technology provides a hydronic system, comprising: a) a first fluid circuit, the first fluid circuit containing a first fluid and including: a first pump operable to circulate the first fluid through the first fluid circuit, and a chilled fluid coil operable to add heat to the first fluid when the first fluid circulates through the chilled fluid coil; b) a first fluid storage tank being fluidly connected to the first fluid circuit such that the first pump circulates the first fluid through the first fluid storage tank when the first pump operates; c) a first heat exchanger defining a first heat exchange surface and a first refrigerant conduit, the first heat exchange surface being in fluid communication with the first fluid storage tank, the first refrigerant conduit being fluidly separated from the first fluid circuit and the second fluid circuit, the first refrigerant conduit having a first end and a second end; d) a second heat exchanger defining a second heat exchange surface and a second refrigerant conduit, the second refrigerant conduit having a first end and a second end, the first end of the second refrigerant conduit being fluidly connected to the first end of the first refrigerant conduit via an expansion valve, the second end of the second refrigerant conduit being fluidly connected to the second end of the first refrigerant conduit via a refrigerant compressor, the first and second refrigerant conduits, the expansion valve, and the refrigerant compressor together defining a refrigerant circuit, the refrigerant circuit containing a refrigerant, and the refrigerant compressor being operable to circulate the refrigerant through the refrigerant circuit to transfer heat from the first refrigerant conduit to the second refrigerant conduit, the first refrigerant conduit receiving heat from the first heat exchange surface at least during operation of the refrigerant compressor; and e) a second fluid circuit, the second fluid circuit containing a second fluid and including: a second pump operable to circulate the second fluid through the second fluid circuit, and a heated fluid coil operable to remove heat from the second fluid when the second fluid circulates through the heated fluid coil, the second heat exchange surface of the second heat exchanger being in fluid communication with the second fluid circuit and transferring heat into the second fluid at least during operation of the refrigerant compressor.

In some implementations, the hydronic system further includes a second fluid storage tank being fluidly connected to the second fluid circuit such that the second pump circulates the second fluid through the second fluid storage tank when the second pump operates, and the second heat exchange surface being in fluid communication with the second fluid storage tank.

In some implementations, the second heat exchange surface is disposed inside the second fluid storage tank.

In some implementations, the hydronic system further includes a third fluid circuit, and wherein the second heat exchanger defines first fluid conduit that is fluidly connected to the third fluid circuit and is fluidly separated from the second refrigerant conduit, the first fluid conduit receiving heat from the second refrigerant conduit at least during operation of the refrigerant compressor.

In some implementations, the first fluid conduit contacts the second refrigerant conduit.

In some implementations, the first fluid conduit is disposed at least in part inside the second refrigerant conduit.

In some implementations, the first fluid conduit is at least in part coaxial with at least a part of the second refrigerant conduit.

In some implementations, the first heat exchanger is disposed outside of the first fluid tank and defines a second fluid conduit, the first heat exchange surface being an inner surface of the second fluid conduit, and the second fluid conduit is fluidly connected to the first fluid tank via a third pump, the third pump being operable to circulate the first fluid through the second fluid conduit.

In some implementations, the first heat exchanger is disposed inside of the first fluid tank, and the first heat exchange surface is an outer surface of the first refrigerant conduit.

For the purposes of this document, the term "ton" of refrigeration capacity refers to 12,000 British thermal units per hour ("BTU/h") or 3.5 kilowatts ("kW").

For the purposes of this document, the term "peak cooling load" means the highest instantaneous cooling load. A peak cooling load in a building will normally occur on the hottest, sunniest, highest occupancy time of the summer. For the purposes of this document, the term "peak heating load" means the highest instantaneous heating load. A peak heating load in a building will normally occur on the coldest night of the year.

For the purposes of this document, the term "design load" means the highest load that a system is designed to satisfy. For example, the design cooling load for a system cooling air in a space could be equal to the peak cooling load of that space, but is commonly slightly below the peak cooling load and may consequently allow for a couple degrees of loss of control of air temperature in that space on some very hot days for example. As another example, the design heating load for a system heating air in a space could be equal to the peak heating load of that space, but is commonly slightly below the peak heating load and may consequently allow for a couple degrees of loss of control in that space on some very cold days for example.

For the purposes of this document, the term "gallons" refers to United States gallons ("US gallons").

Other aspects and features will become apparent, to those ordinarily skilled in the art, upon review of the following description of the exemplary embodiments shown and described in this document.

BRIEF DESCRIPTION OF THE DRAWINGS

The drawings included herewith are for illustrating various examples of articles, methods, and apparatuses of the present specification. In the drawings.

DETAILED DESCRIPTION

Examples of systems, methods, and implementations are described below. These examples are non-limiting.

Figure 1:
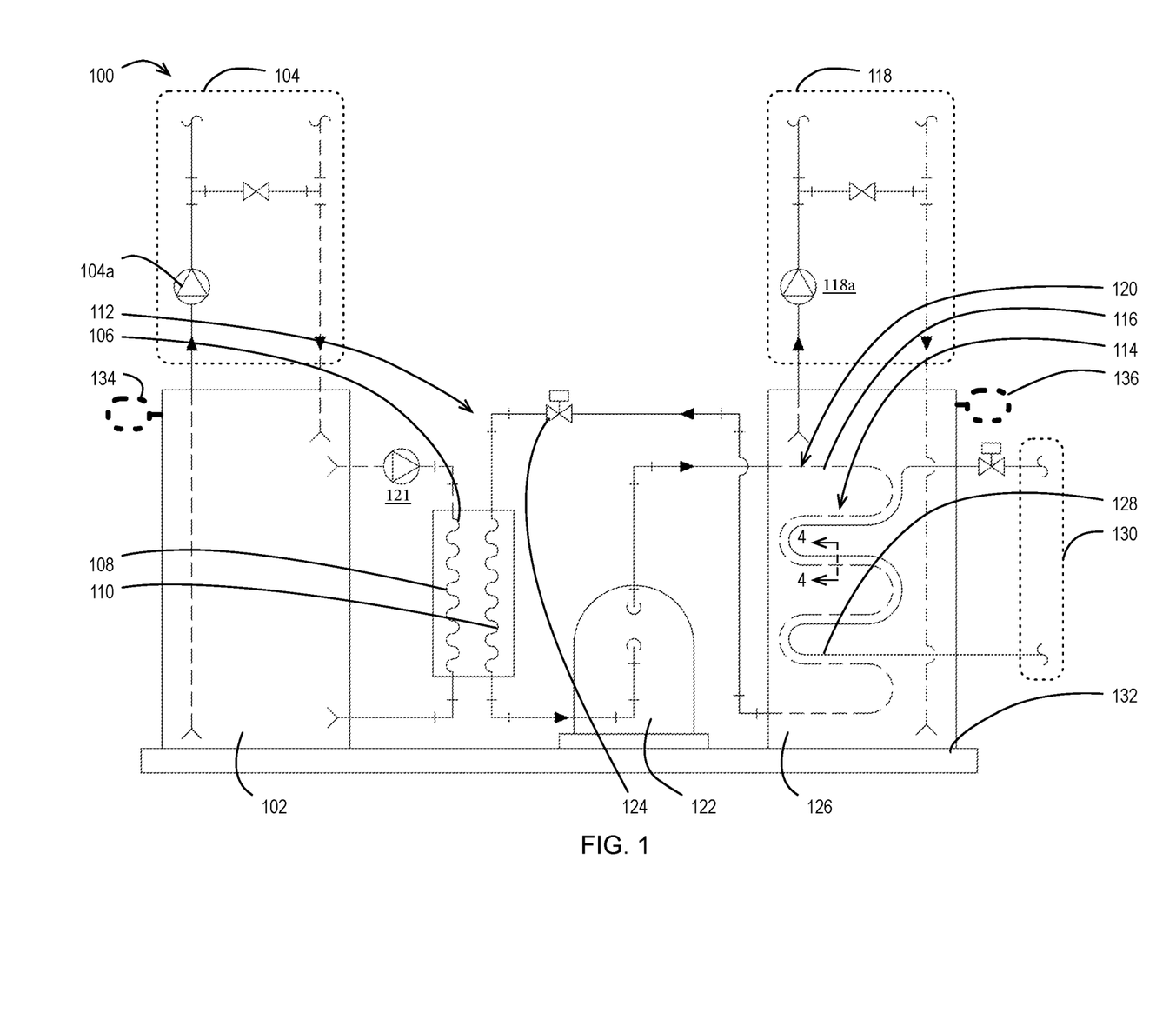
FIG. 1 is a schematic of a heat transfer system, according to a first embodiment.

Reference is made to FIG. 1, which shows a first embodiment of a heat transfer system 100. The heat transfer system 100 comprises a first fluid storage tank 102 fillable with a first fluid and fluidly connectable to a first fluid circuit 104 for circulating the first fluid between the first fluid circuit 104 and the first fluid storage tank 102 for heat exchange between the first fluid circuit 104 and the first fluid.

Figure 6:
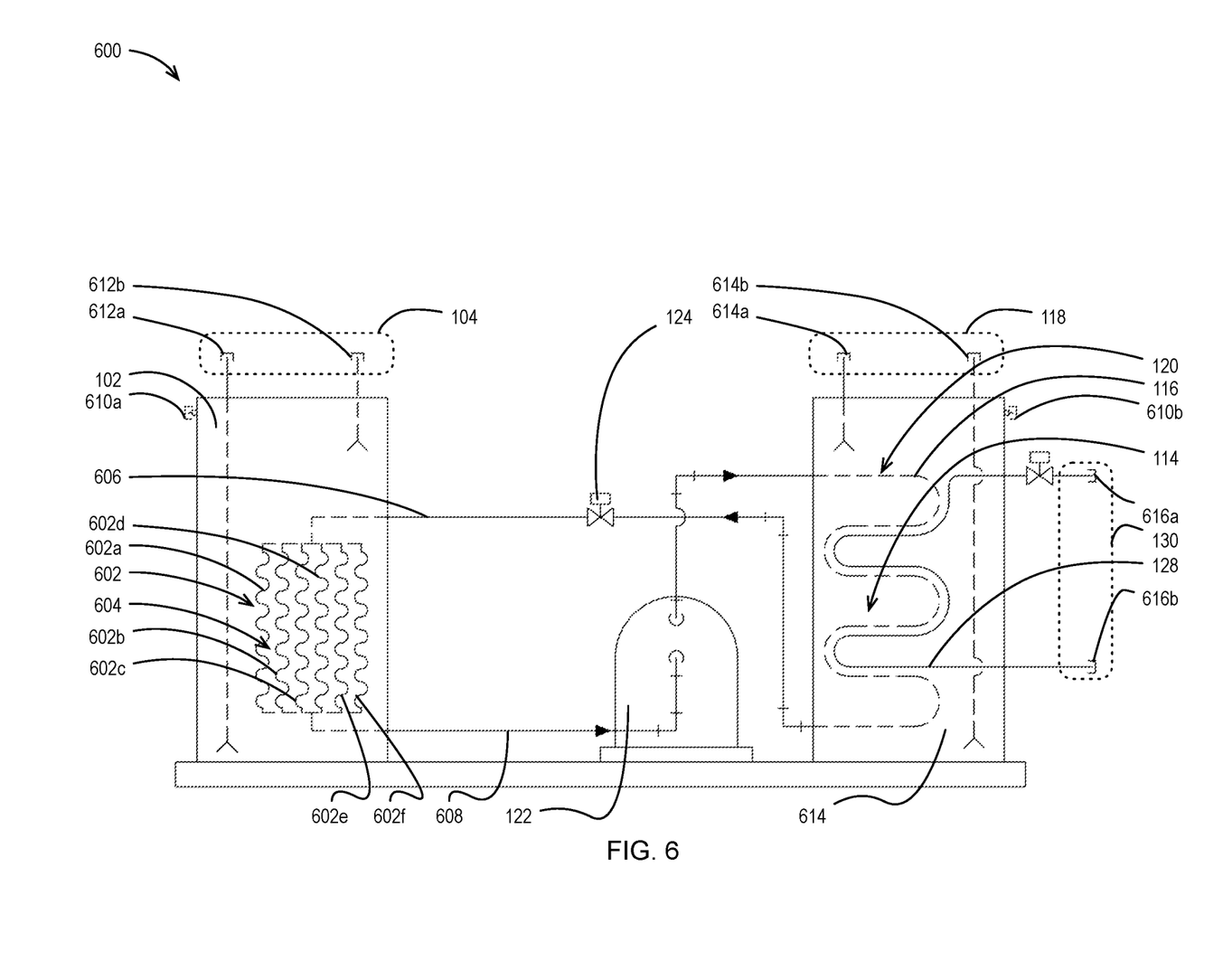
FIG. 6 is a schematic of a heat transfer system, according to a fourth embodiment.

As shown in FIG. 6 for example, the heat transfer system 100 may be manufactured with suitable connections 612a-612b, 614a-614b, 616a-616b for connecting the heat transfer system 100 in its various applications, as described in this document. For example, fluid connections 612a and 612b may be provided as suitable fluid conduits to make the first fluid storage tank 102 connectable to the first fluid circuit 104. In some cases, the connections 612a-612b, 614a-614b, 616a-616b may be capped for shipping prior to installation.

Figure 2:
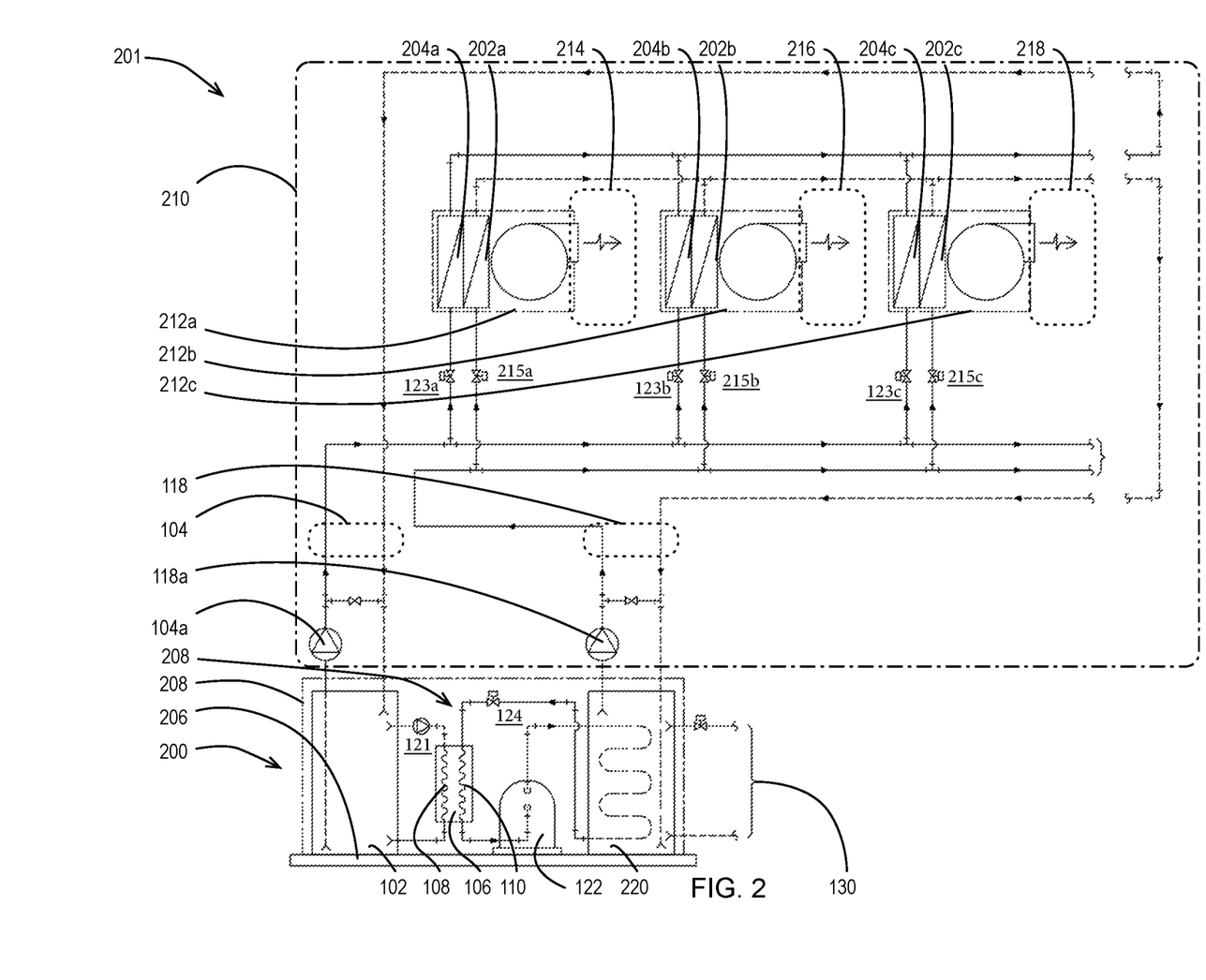
FIG. 2 is a schematic of a heat transfer system, according to a second embodiment, implemented to serve a plurality of fan coil units.

The first fluid circuit 104 is shown in FIG. 2, and shown in part in FIG. 1 for clarity. While a particular example of the of the first fluid circuit 104 is shown, it is contemplated that the first fluid circuit 104 could be a different fluid circuit. For example, the first fluid circuit 104 could include at least one of a heat source and a heat sink. In the present implementation, the first fluid circuit 104 includes a plurality of heat sources 204a-204c. The heat sources in this example are chilled fluid heat exchangers 204a-204c disposed inside fan coils 212a-212c.

In the embodiment shown in FIG. 2, the first fluid circuit 104 includes a pump 104a for circulating the first fluid through the first fluid circuit 104. In use, the first fluid storage tank 102 is filled the first fluid at least to a level (within the tank 102) that will permit the operation described in this document, given the particular embodiment of that tank 102. In some implementations, the first fluid storage tank 102 is substantially completely filled with the first fluid. In the present implementation, when the pump 104a of the first fluid circuit 104 operates, it draws the first fluid from a bottom portion of the tank 102 and returns it to a top portion of the tank 102. In the present implementation, this is provided by corresponding pipes (see FIG. 1 for example), one of which extends to and terminates at the bottom portion of the tank 102 and the other of which extends to and terminates at the top portion of the tank 102. It is contemplated that a different set of fluid connections could be used, in other applications for example.

The first fluid is drawn from the first fluid storage tank 102 by the first fluid circuit 104, via the pump 104a of the first fluid circuit 104. In other words, the first fluid storage tank 102 supplies the first fluid to the first fluid circuit 104. The first fluid then circulates through one or more of the chilled fluid heat exchangers 204a-204c of the first fluid circuit 104, depending on the cooling requirements of the spaces 214-218 served by the fan coils 212a-212c and the operation of corresponding flow controls, such as the example two-way control valves 123a-123c, and may receive heat from those spaces 214-218 via the chilled fluid heat exchangers 204a-204c. Thus, the chilled fluid heat exchangers 204a-204c may be heat sources.

As shown in FIG. 1, the heat transfer system 100 further comprises a first heat exchanger 106 having a first heat exchange surface 108 and a first refrigerant conduit 110 of a refrigerant circuit 112. The first heat exchange surface 108 is in fluid communication with the first fluid when the heat transfer system 100 is in use. The first refrigerant conduit 110 is positioned in the first heat exchanger 106 for heat exchange with the first heat exchange surface 108.

Figure 3:
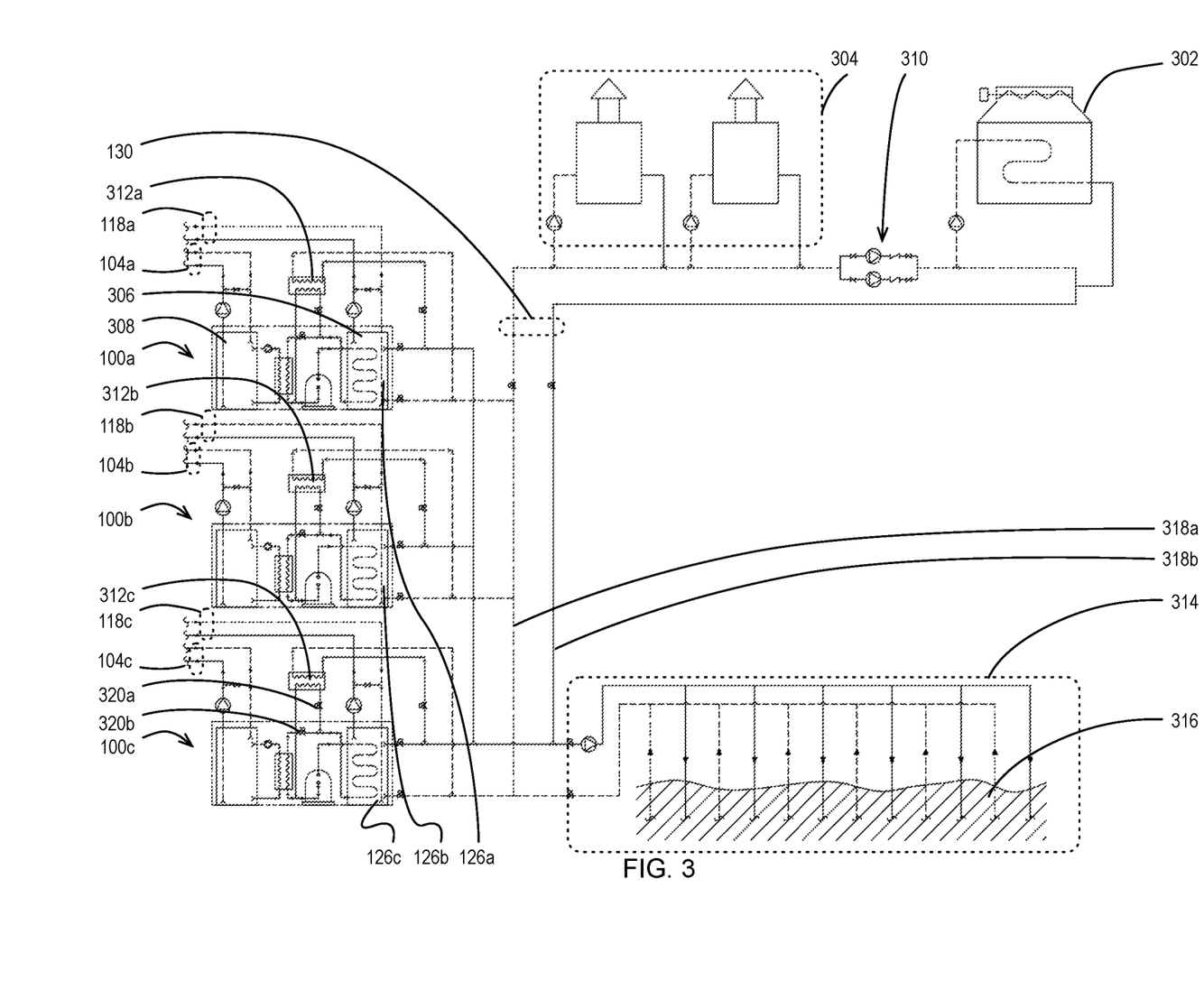
FIG. 3 is a schematic of a plurality of heat transfer systems, according to a third embodiment, fluidly connected to a fluid circuit that includes a heat sink and a heat source.

In embodiments of FIGS. 1 to 3, the first heat exchange surface 108 is an internal surface of a first fluid conduit 108 defined by and passing through the first heat exchanger 106 and positioned for heat exchange with the first refrigerant conduit 110 of the refrigerant circuit 112 (which first refrigerant conduit 110 also passes through and is defined by the example heat exchanger 106). The first fluid in the first fluid circuit 104 may circulate through that first fluid conduit 108 when the heat transfer system 100 is in use, in this example by an auxiliary pump that draws the first fluid from an upper portion of the tank 102 and after circulation returns the fluid to a bottom portion of the tank 102 via suitable fluid piping. Thus, in this implementation, the first heat exchange surface 108 is in fluid communication with the first fluid at least when the first fluid circulates through the first fluid conduit 108.

In the embodiments shown in FIGS. 1 to 3, the first heat exchanger 106 is disposed outside of the first fluid storage tank 102. In other embodiments, such as the embodiment shown in FIG. 6, the first heat exchanger 106, 602 is disposed inside the first fluid storage tank 102. As shown in FIG. 6 for example, in embodiments where the first heat exchanger 106 is disposed inside the first fluid storage tank 102, the first heat exchanger 106 may include a refrigerant conduit 604 positioned inside the first fluid storage tank 102 to transfer heat between refrigerant in the refrigerant circuit 112 and the first fluid in the first fluid storage tank 102.

In the embodiment shown in FIG. 6, the refrigerant conduit 604 includes a plurality of refrigerant flow paths 602a-602f fluidly and in parallel connecting refrigerant conduit 606 to refrigerant conduit 608. In other examples, the refrigerant conduit 604 may have a single flow path. Similar to all other components of the heat transfer system 100, the refrigerant conduit 110, 604 of the first heat exchanger 106 may be selected using known heat transfer calculation and selection methods so as to provide for the functionality described in this document.

In embodiments where the first heat exchanger 106 is disposed inside the first fluid storage tank 102, the first refrigerant conduit 110 of the refrigerant circuit 112 may be the refrigerant conduit 604, and the first heat exchange surface 108, 604 may be an external surface 604 of that refrigerant conduit 604. In some examples, such as the embodiment of FIG. 1, the refrigerant conduit 110 may be a single tube, such as a copper tube, fluidly connecting refrigerant conduits 606 and 608 of the refrigerant circuit 112. In other examples, and as shown in FIG. 6, the refrigerant conduit 604 may include a plurality of tubes 602a-602f, such as a plurality of copper tubes 602a-602f, fluidly connecting refrigerant conduits 606 and 608 of the refrigerant circuit 112.

In embodiments where the first heat exchanger 602 is disposed inside the first storage tank 102, the first heat exchanger 602 may include a refrigerant conduit 604 and the first heat exchange surface 108, 604 may be an external surface 604 of that refrigerant conduit 604. Thus, in such embodiments the first fluid in the first storage tank 102 contacts that external surface 604 and is thereby in fluid communication with the first fluid. The refrigerant conduit 604 may have a single flow path in some embodiments and may have a plurality of flow paths 602a-602f in other embodiments.

The first heat exchanger 106 may be any other suitable heat exchanger selected using known heat exchanger selection and sizing techniques to enable the operation of the heat transfer system 100, 200, 600 as described in this document.

As shown in FIGS. 1 to 3 and 6, the example embodiments of the heat transfer system 100, 200, 600 also comprise a second heat exchanger 114 having a second heat exchange surface 120 that is fluidly connectable to a second fluid circuit 118 for heat exchange with the second fluid circuit 118 and having a second refrigerant conduit 116 of the refrigerant circuit 112 positioned for heat exchange with the second heat exchange surface 120.

In a further aspect, the example heat transfer systems 100, 200, 600 further comprise a refrigerant compressor module 122 and an expansion valve 124 fluidly connected to the refrigerant circuit 112 for circulating a refrigerant through the refrigerant circuit 112 for heat exchange between the first refrigerant conduit 110 and the second refrigerant conduit 116 of the refrigerant circuit 112. The refrigerant compressor module 122 in combination with the expansion valve 124 is operable to transfer heat between the first refrigerant conduit 110 and the second refrigerant conduit 116, and therefore between the first heat exchanger 106, 602 and the second heat exchanger 114 via a suitable refrigerant in the refrigerant circuit 112. In other words, in the present implementation, the refrigerant compressor module 122, the expansion valve 124, the first refrigerant conduit 110 and the second refrigerant conduit 116 define a refrigeration circuit. The refrigerant circuit 112 could be any suitable refrigerant circuit.

In a further aspect, some embodiments of the heat transfer system 100, 200, 600 comprise a second fluid storage tank 126, 614 fillable with a second fluid, such as a glycol solution, and fluidly connectable to the second fluid circuit 118 for circulating the second fluid between the second fluid circuit 118 and the second fluid storage tank 126, 614 for heat exchange between the second fluid circuit 118 and the second fluid. Thus, as shown in FIGS. 1 to 3 and 6, the heat transfer system 100, 200, 600 may be implemented to transfer heat from the first fluid storage tank 102 to the second fluid storage tank 126, and from the first fluid circuit 104 to the second fluid circuit 118.

In some embodiments, the second heat exchange surface 120 is in fluid communication with the second fluid when the heat transfer system 100, 200, 600 is in use for heat exchange with the second fluid. As shown in FIGS. 1 and 6, in some embodiments of the heat transfer system 100, 200, 600 that comprise a second fluid storage tank 126, 614, the second heat exchanger 114 is disposed inside the second fluid storage tank 126, 614.

The second fluid circuit 118 may include at least one of a heat source and a heat sink. The second fluid circuit 118 of the present implementation is shown in FIG. 2, and is shown in part in FIG. 1 for clarity. In this exemplary implementation, the second fluid circuit 118 includes a plurality of heat sinks 202a-202c. The heat sinks 202a-202c in this example are heated fluid heat exchangers 202a-202c disposed inside the fan coils 212a-212c.

Reference is now made to FIGS. 1, 3, 4 and 5. In an aspect, in some embodiments of the heat transfer system 100, 200, 600, the second heat exchanger 114 includes a heat transfer conduit 128 fluidly connectable to a third fluid circuit 130 for circulating a third fluid between the heat transfer conduit 128 and the third fluid circuit 130 for heat exchange between the heat transfer conduit 128 and the third fluid circuit 130. The heat transfer conduit 128 may be positioned for heat exchange with the second refrigerant conduit 116 of the refrigerant circuit 112.

Figure 4:
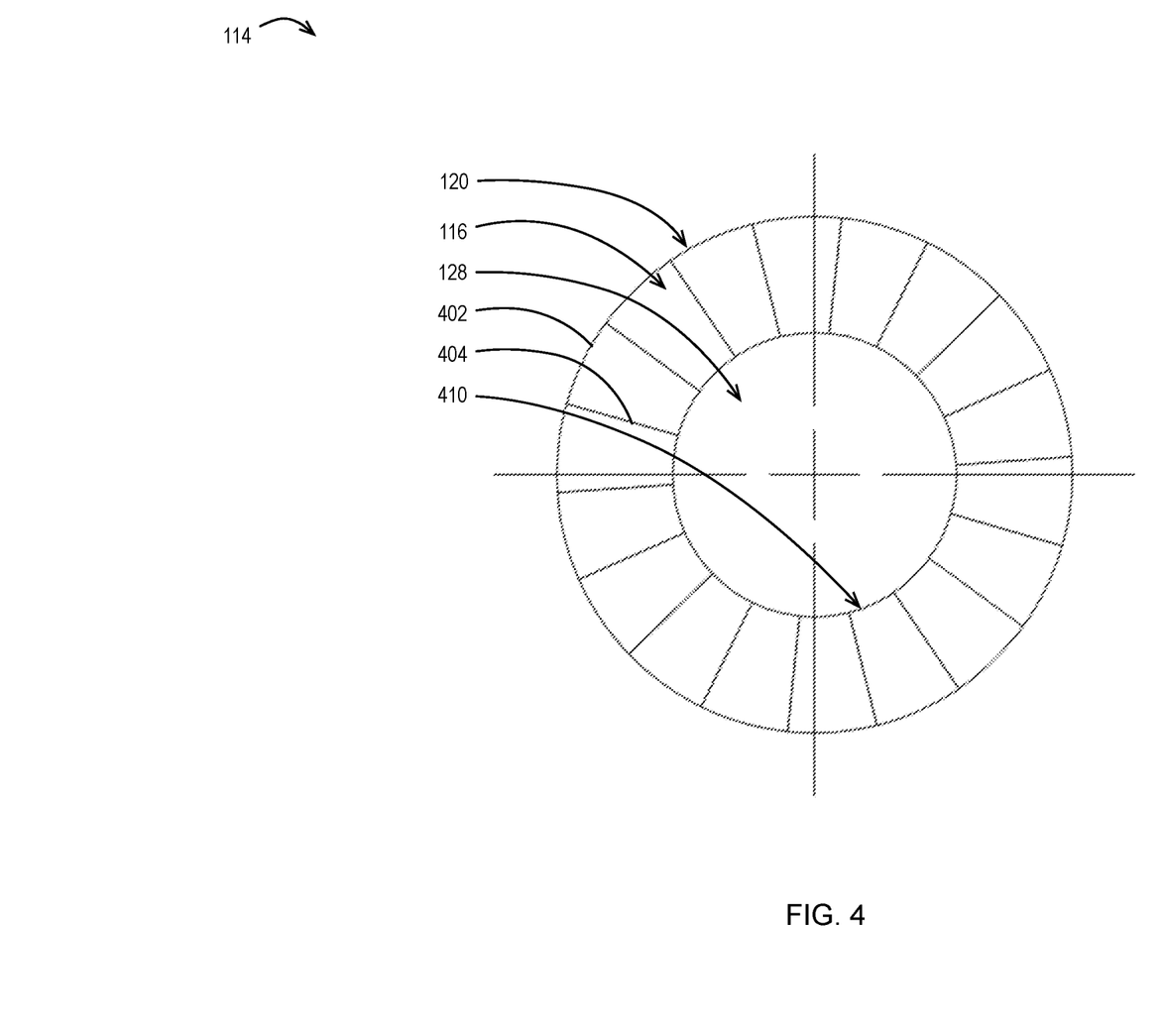
FIG. 4 is a cross section of a first example embodiment of a heat exchanger of the heat transfer system of FIG. 1, taken along reference lines 4-4 of FIG. 1.

In some embodiments, the heat transfer conduit 128 is fluidly separated from the second fluid storage tank 126. FIG. 4 shows a cross section of an example embodiment of the second heat exchanger 114, taken along reference lines 4-4 of FIG. 1. As shown in FIG. 4, in some embodiments the heat transfer conduit 128 is disposed inside the second refrigerant conduit 116 of the refrigerant circuit 112.

In this embodiment, the heat transfer conduit 128 is disposed coaxially with and inside of the second refrigerant conduit 116 of the refrigerant circuit 112. In some embodiments, the external surface of the heat transfer conduit 128 (which, in some embodiments, is an internal surface of the second refrigerant conduit 116) is connected to an external wall 402 of the second refrigerant conduit 116 of the refrigerant circuit 112 by a plurality of heat transfer fins 404. The heat transfer fins 404 may be any suitable fins, such as extruded copper fins. In this example, the second heat exchange surface 120 is an external surface 120 of an external wall 402 of the second refrigerant conduit 116 of the refrigerant circuit 112.

Figure 5:
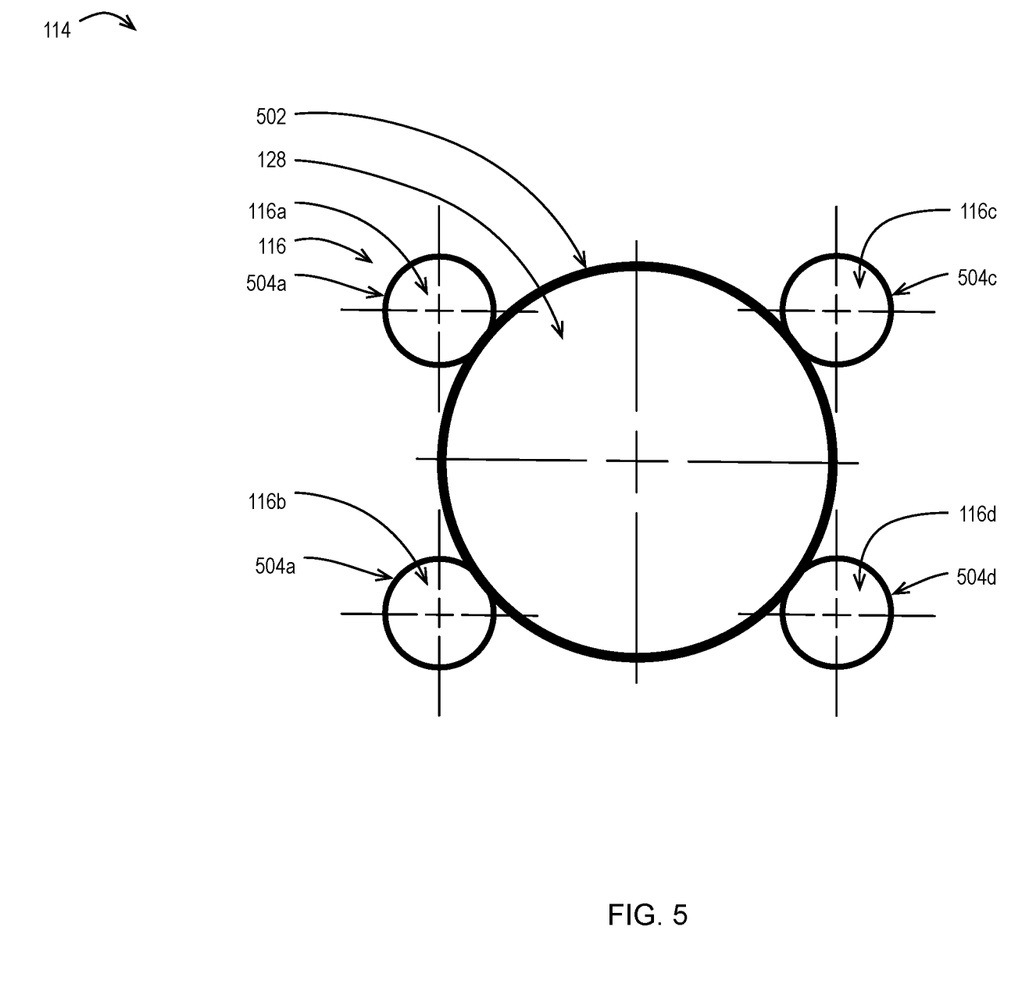
FIG. 5 is a cross section of a second example embodiment of a heat exchanger of the heat transfer system of FIG. 1, taken along reference lines 4-4 of FIG. 1.

In a further aspect, and as illustrated in FIGS. 4 and 5, in some embodiments, the heat transfer conduit 128 is connected along at least a portion of its length to the refrigerant conduit 116. In the example of FIG. 4, the heat transfer conduit 128 is connected along a portion of its length to the refrigerant conduit 116 via the plurality of heat transfer fins 404.

The second heat exchanger 114 may be any suitable heat exchanger. In a further aspect, the second heat exchanger 114 may be implemented as a heat exchanger configured to transfer heat directly between the refrigerant circuit 112 and the second fluid in the second fluid tank 126, as well as directly between the refrigerant circuit 112 and the heat transfer conduit 128.

Reference is now made to FIG. 5, which shows a cross section of another embodiment of the second heat exchanger 114, taken along reference lines 4-4 of FIG. 1. In this embodiment, the second refrigerant conduit 116 of the refrigerant circuit 112 includes a plurality of refrigerant tubes 116a-116d for carrying refrigerant in parallel. As shown, the heat transfer conduit 128 and the second refrigerant conduit 116 may be positioned such that a portion 502 of the heat transfer conduit 128 and a portion 504a-504d of the second refrigerant conduit 116 may be in contact with the second fluid in the second fluid storage tank 126. Such contact may provide for direct heat exchange between the refrigerant circuit 112 and the second fluid.

Reference is now made to FIG. 3. Depending on the implementation of the heat transfer system 100, 200, 600, the third fluid circuit 130 may include a heat sink. In a further aspect, the third fluid circuit 130 may include a heat source. In some implementations, the third fluid circuit 130 may include both a heat sink and a heat source that may be operable to selectively reject heat from and inject heat into the third fluid circuit 130, respectively, depending on, for example, heating and/or cooling loads, if any, on the first fluid circuit 104 and the second fluid circuit 118. As shown in FIG. 3, the heat source may include a boiler plant 304 and the heat sink may include a cooling tower 302.

Examples of heat sources include boiler(s) 304, and geothermal ground circuit(s) 316. Examples of heat sinks include cooling tower(s) 302 and the geothermal ground circuit(s) 316.

In the example implementation shown in FIG. 2, the first fluid storage tank 102 is a chilled fluid storage tank 102, the second fluid storage tank 126 is a heated fluid storage tank 126, and the refrigerant compressor module 122 in combination with the expansion valve 124 is operable to transfer heat from the chilled fluid storage tank 102 to the heated fluid storage tank 126.

Each of the first, second, and third fluids may be any fluid(s) suitable to a given application of the heat transfer system(s) 100, 200, 600, with one example for some applications being glycol solution.

In the example application shown in FIG. 2, the heat transfer system 100, 200, 600 is connected to serve fan coils 212a-212c, so as to provide heating, cooling, and dehumidification to spaces 214-218 served by the fan coils 212a-212c. The fan coils 212a-212c are four-pipe fan coils implemented in an HVAC system 210 that serves the spaces 214-218. The fan coils 212a-212c are positioned to selectively heat, cool, and dehumidify the spaces 214-218 in response to heating, cooling, and dehumidification loads in each of the spaces 214-218.

The second fluid circuit 118 in this example includes a pump 104a for circulating a second fluid through the second fluid circuit 118. In use, the second fluid storage tank 220 may be filled with the second fluid (to a level inside the second fluid storage tank 220 that is sufficient to provide for the functionality of the heat transfer system 100, 200, 600 as described in this document). In some applications, the second fluid storage tank 220 may be substantially completely filled with the second fluid.

The second fluid may be drawn from the second fluid storage tank 220 by the second fluid circuit 118, via, for example, the pump 118a of the second fluid circuit 118. In other words, the second fluid storage tank 220 may supply the second fluid to the second fluid circuit 118. The second fluid may selectively circulate through the heated fluid heat exchangers 202a-202c, depending on the heating and dehumidification requirements of the spaces 214-218 served by the fan coils 212a-212c and operation of corresponding flow controls such as the example two-way control valves 215a-215c, and may reject heat into the spaces 214-218 via the heated fluid heat exchangers 204a-204c. It will be appreciated that the first 104, second 118 and third 130 fluid circuits may be any suitable fluid circuits implemented using known engineering techniques and equipment.

In this example, the heat transfer system 100, 200, 600 may satisfy the dehumidification requirements of the spaces 214-218 by making heated fluid (in this example, the second fluid) and chilled fluid (in this example, the first fluid) available to the fan coils 212a-212c simultaneously. When a given space 214-218 served by a corresponding fan coil 212a-212c calls for dehumidification of air in that space, the fan coil 212a-212c may operate its chilled fluid heat exchanger 204a-204c to cool air drawn by that fan coil 212a-212c so as to dehumidify it. The fan coil 212a-212c may simultaneously operate its heated fluid heat exchanger 202a-202c to re-heat the air to a required supply air temperature before it enters into the space 214-218.

In an aspect, re-heated dehumidified air supplied to a space 214-218 may provide for relatively improved comfort in that space 214-218, in comparison to a level of comfort that may be provided where only dehumidified and not-reheated air may be available for that space 214-218.

Reference is now made to FIG. 3. As shown, a plurality of the heat transfer systems 100a-100c are implemented to serve a plurality of loads connected to a plurality of fluid circuits 104a-104c, 118a-118c. It is contemplated that any other number of and/or combination of embodiments of the heat transfer system 100, 200, 600 could be used. The heat transfer systems 100a-100c are operable to provide heated and chilled fluids (first and second fluids, respectively) simultaneously to the respective fluid circuits 104a-104c, 118a-118c. Where the application is an HVAC application, the fluid circuits 104a-104c, 118a-118c may include any suitable combination of HVAC equipment serving the plurality of loads. Fluid circuits 104a-104c may be chilled fluid circuits. Fluid circuits 118a-118c may be heated fluid circuits.

Depending on the HVAC equipment (such as four-pipe fan coils 212a-212c) used to serve the plurality of loads, the HVAC equipment may use the simultaneous availability of the heated and chilled fluids to provide dehumidification of air with re-heat as described above.

In a more particular aspect, the heat transfer systems 100a-100c are operable to make heat available by providing heated fluid to the second fluid circuits 118a-118c of the plurality of fluid circuits 104a-104c, 118a-118c as a by-product of operating the compressor modules 122 when chilled fluid is required to be supplied to the first fluid circuits 104a-104c. During times when no chilled fluid is required, the heat transfer systems 100a-100c are operable to provide the heated fluid via the third fluid circuit(s) 130. In turn, heat in the third fluid circuit(s) 130 may be available from, for example, a boiler plant 304. The third fluid circuit(s) 130 may provide heat to the second fluid storage tanks 126a-126c and thereby make it available for the second fluid circuit(s) 118a-118c.

In many jurisdictions, gas (such as natural gas) may be a cheaper source of heat than electricity. In jurisdictions where gas may be a relatively more expensive than electricity, or where it may be unavailable, the heat transfer system(s) 100, 200, 600 may make heat available to the second fluid circuit(s) 118 via a most convenient source of heat. The most convenient source of heat may be connected to a third fluid circuit(s) 130.

Further implementation details are described next.

As described above, the third fluid circuit 130 may include a geothermal ground circuit 314 that may be operable to selectively extract heat from a selected ground 316 or reject heat into the ground 316.

In such implementations, one or more of the heat transfer systems 100a-100c may include a third heat exchanger 312a, 312b, 312c. In the example shown in FIG. 3, each of the heat transfer systems 100a-100c includes a third heat exchanger 312a, 312b, 312c, respectively. Typically, geothermal ground circuits 314 provide fluid at temperatures below the temperature(s) that may be suitable to provide for hydronic heating without the use of a refrigeration cycle. Thus, the third heat exchanger 312a, 312b, 312c of a given heat transfer system 100, 200, 600 may be connected (via a suitable piping and valving arrangement) so as to transfer heat, by operating the compressor module 122 of that heat transfer system 100, 200, 600, from the geothermal ground circuit 314 to the second fluid storage tank 126 of that heat transfer system 100, 200, 600 when that heat transfer system 100, 200, 600 is in a heating mode.

In a mode of operation where the third heat exchanger 312a, 312b, 312c is operating with the compressor module 122 and the refrigerant circuit 112 to transfer heat from the geothermal ground circuit 314 to the second fluid storage tank 126, the second fluid storage tank 126 may be fluidly isolated, using a suitable valving arrangement, from the third fluid circuit 130. This may be done to avoid losing heat from the second fluid storage tank 126 into the geothermal ground circuit 314.

In an aspect, when the heat transfer system 100, 200, 600 is in a cooling mode, the third heat exchanger 312a, 312b, 312c of that heat transfer system 100, 200, 600 may be fluidly isolated (via a suitable valving arrangement) from the refrigerant circuit 112 and from the third fluid circuit 130 and the compressor module 122 may operate to transfer heat from the first fluid storage tank 102 to the third fluid circuit 130 and to the geothermal ground circuit 314.

Particular examples of some embodiments of the heat transfer system 100, 200, 600 are described next.

As shown in FIG. 1 for example, the heat transfer system 100, 200, 600 may comprise a base 132. The refrigerant compressor module 122 and the first fluid storage tank 102 may be disposed on that base 132. In a further aspect, the heat transfer system 100, 200, 600 may further comprise an enclosure 208 and the refrigerant compressor module 122 and the first fluid storage tank 102 may be disposed inside the enclosure 208.

In some of the embodiments in which the heat transfer system 100, 200, 600 includes the third heat exchanger 312, the third heat exchanger 312a, 312b, 312c may be disposed inside the enclosure 208.

In embodiments of the heat transfer system 100, 200, 600 that comprise the second fluid storage tank 126, 220, the refrigerant compressor module 122, the first fluid storage tank 102 and the second fluid storage tank 126, 220 may be disposed on that base 132. In embodiments of the heat transfer system 100, 200, 600 that comprise the second fluid storage tank 126, 220 and an enclosure 208, the refrigerant compressor module 122, the first fluid storage tank 102 and the second fluid storage tank 126, 220 may be disposed inside the enclosure 208.

In a further aspect, the heat transfer system 100, 200, 600 may further comprise a first expansion tank 134 fluidly connected to the first fluid storage tank 102 so as to absorb expansion of a given volume of the first fluid over a given temperature rise of the first fluid. In embodiments of the heat transfer system 100, 200, 600 comprising a second fluid storage tank 126, the heat transfer system 100, 200, 600 may further comprise a second expansion tank 136 fluidly connected to the second fluid storage tank 126 so as to absorb expansion of a given volume of the second fluid over a given temperature rise of the second fluid.

Reference is now made to FIG. 6. The heat transfer system 100, 200, 600 may include expansion tank connection(s) 610a, 610b in any suitable position(s). For example, in embodiments of the heat transfer system 100, 200, 600 that include both the first fluid storage tank 102 and the second fluid storage tank 126, an expansion tank connection 610a, 610b may be provided on each of the first fluid storage tank 102 and the second fluid storage tank 126.

In some cases, the heat transfer system 100, 200, 600 may be manufactured with caps 610a-b, 612a-612b, 614a-614b, 616a-616b provided at the various connections of the heat transfer system 100, 200, 600 to protect the various connections until a time when the heat transfer system 100, 200, 600 may be connected to, for example, first fluid circuit(s) 104, second fluid circuit(s) 118, and third fluid circuit(s) 130. The time may be when the heat transfer system 100, 200, 600 is delivered to an installation site.

Possible sizing and selection of the heat transfer system 100, 200, 600 are described next.

In an aspect, the first fluid storage tank 102 may be sized to satisfy a first cooling load served by the first fluid circuit 104 for a first design period of time during which the refrigerant compressor module 122 is off and during which the first fluid in the first fluid storage tank 102 is within a design temperature range. In this mode of operation, the first fluid storage tank 102 may satisfy the first cooling load by supplying the first fluid in the first fluid storage tank 102 to the first fluid circuit 104. The term supplying is used in the sense of making the first fluid in the first fluid storage tank 102 available to be drawn therefrom by the first fluid circuit 104, for example by a pump 104a of the first fluid circuit 104.

In one aspect, the first design period of time may be a given time-off of at least one refrigerant compressor of the refrigerant compressor module 122 in embodiments where the refrigerant compressor module 122 includes a plurality of refrigerant compressors, and may be a given time-off of the refrigerant compressor module 122 in embodiments where the refrigerant compressor module 122 comprises a single refrigerant compressor.

Some models of refrigerant compressors may have a recommended time-off, for example as specified by the manufacturer(s) of those refrigerant compressors. For example, a given time-off may be recommended for a given refrigerant compressor to prolong that refrigerant compressor's useful life and reduce a risk of premature failure.

In a particular embodiment, the first fluid storage tank 102 may be sized to provide a given time-off of five minutes for each refrigerant compressor of the refrigerant compressor module 122 in embodiments where the refrigerant compressor module 122 comprises a plurality of refrigerant compressors, and a given time-off of five minutes for the refrigerant compressor module 122 in embodiments where the refrigerant compressor module 122 comprises a single refrigerant compressor.

In the example embodiments of FIGS. 1, 2 and 6, the refrigerant compressor module 122 comprises a single refrigerant compressor 122.

In a further aspect, the design temperature range (of the first fluid in the first fluid tank 102) may be a range of temperatures between a first design temperature and a second design temperature. The second design temperature may be higher than the first design temperature. A first refrigerant compressor of the refrigerant compressor module 122 may be sized to cool substantially all of the first fluid in the first fluid storage tank 102, while the first fluid circuit 104 is off (that is, while the first fluid is stationary in the first fluid circuit 104, and thus while none of the first fluid is being drawn from the first fluid storage tank 102), from the second design temperature to the first design temperature in a second design period of time.

In some implementations, the first design temperature may be between about 45 degrees Fahrenheit ("F.") (7.2 degrees C.) and about 50 F (10.0 degrees C.). The second design temperature may be between about 55 F and about 60 F. In a preferred implementation, the first design temperature may be about 47 F and the second design temperature may be about 57 F.

In another aspect, the second design period of time may be at least five minutes. In some implementations, the second design period of time is between five and ten minutes. In a preferred implementation, the second design period of time is five minutes.

The refrigerant compressor module 122 may comprise at least one refrigerant compressor 122. In a particular aspect, the second design period of time may be a minimum run time of the at least one refrigerant compressor 122. The minimum run time may be set at different values and may be selected to suit the at least one refrigerant compressor 122 of the refrigerant compressor module 122. The second design period of time may be adjusted by, for example, changing the size of the first fluid storage tank 102 relative to a particular nominal cooling capacity of the at least one refrigerant compressor of the refrigerant compressor module 122.

In an aspect, a given minimum run time may be recommended by the manufacturer of a given refrigerant compressor. The minimum run time may, for example, improve the useful life and reliability of that refrigerant compressor. In another aspect, a given minimum run time may be recommended by the manufacturer to improve the operating efficiency of that particular refrigerant compressor.

In a further aspect, the first cooling load may be in magnitude between about 30% and about 40% of a design cooling load. The refrigerant compressor module 122 may be sized to continuously satisfy the design cooling load at design operating conditions.

In an aspect, the heat transfer system 100, 200, 600 may be implemented with a first fluid circuit 104 that may have a variable flow rate of the first fluid therethrough. In a further aspect, the heat transfer system 100, 200, 600 may be implemented with a second fluid circuit 118 that may have a variable flow rate of the second fluid therethrough. In yet a further aspect, the heat transfer system 100, 200, 600 may be implemented with a third fluid circuit 130 that may have a variable flow rate of the second fluid therethrough. Variable flows through such fluid circuits 104, 118, 130 may be provided by implementing such circuits 104, 118, 130 with suitable variable frequency pumps 104a, 118a, and 310, respectively.

In another aspect, the first fluid storage tank 102 may be sized at about five to fifteen gallons per nominal ton of refrigeration capacity of the refrigerant compressor module 122. In a particular embodiment, the first fluid storage tank 102 may be sized at ten gallons per nominal ton of capacity of the refrigerant compressor module 122.

For some applications, such as HVAC applications where a first fluid circuit 104 may be designed to be implemented with at least one heat transfer system 100, 200, 600, that first fluid circuit 104 may be sized to circulate, for example, about two gallons of the first fluid per minute for each nominal ton of cooling capacity of the refrigerant compressor module 122 of the at least one heat transfer system 100, 200, 600. The first fluid circuit 104 may be implemented with a variable frequency pump 104a that may substantially match the (circulation) flow rate of the first fluid through that first fluid circuit 104 to a real-time cooling demand of that first fluid circuit 104.

Depending on the implementation, more than one heat transfer system 100, 200, 600 may be implemented to serve a given first fluid circuit 102. In a particular example, a given first fluid circuit 102 may be served by a single heat transfer system 100, 200, 600.

For illustration purposes only, a design cooling load on that first fluid circuit 104 may be, for example, 12 tons of cooling, and the refrigerant compressor module 122 may comprise a single refrigerant compressor having a matching capacity of 12 tons of cooling. The first fluid circuit 104 may be thus sized to circulate 24 gallons per minute ("gpm") of the first fluid, and thus to draw 24 gpm of the first fluid from the first fluid storage tank 102 when operating at the design cooling load.

Thus, in one example, the first fluid storage tank 102 of that single heat transfer system 100, 200, 600 may be sized to accommodate a first cooling load, the first cooling load having a magnitude of about 4 tons of cooling (about 30% of that design cooling load), for a first design period of time of, for example, five minutes, while the refrigerant compressor module 122 of that heat transfer system 100, 200, 600 is off.

The given first fluid circuit 104 may reduce flow of the first fluid therethrough to about 8 gpm, to accommodate the first cooling load (4 tons of cooling times two gallons per minute per ton of cooling is 8 gallons per minute). Thus, the first fluid storage tank 102 may be sized to hold about 40 gallons of the first fluid (5 minutes times 8 gpm per minute). At this size, the first fluid storage tank 102 may supply the first fluid to the given first fluid circuit 104 for 5 minutes at 8 gpm flow rate of the first fluid, and may thus satisfy the first cooling load for 5 minutes. Accordingly, a given time-off of that refrigerant compressor module 122 of 5 minutes may be thereby provided for occurrences of the first cooling load.

In another aspect, for this example application, the first fluid storage tank 102 may be sized so that it may take the refrigerant compressor module 122 at least a minimum given run time to cool substantially all of the first fluid in that first fluid storage tank 102, while the first fluid circuit 104 is off (no circulation of the first fluid therethrough), from a second design temperature, such as for example 57 degrees Fahrenheit ("F.") (13.9 degrees C.) to a first design temperature, such as for example 47 degrees F. (8.3 degrees C.).

As described above, the refrigerant compressor module 122 may comprise a single compressor. In other embodiments, the refrigerant compressor module 122 may comprise a plurality of refrigerant compressors. The refrigerant compressor module 122 may comprise any suitable refrigerant compressor(s). In some implementations, the refrigerant compressor module 122 may comprise refrigerant compressor(s) with various capacity-varying options such as variable frequency drives.

Depending on the cooling capacity of the refrigerant compressor module 122, and more particularly a lowest nominal cooling capacity at which the refrigerant compressor module 122 may operate (for example, where twelve tons of cooling are provided via two six-tons-of-cooling compressors, the lowest nominal cooling capacity of that refrigerant compressor module 122 may be six tons of cooling provided by the operation of one of the two refrigerant compressors), the size of the first fluid storage tank 102 required to provide a desired minimum run time of that refrigerant compressor module 122 may exceed the size required to provide the given (recommended) time-off.

In such cases, depending on the particular refrigerant compressor(s) used, and depending on the particular system(s) served by the first fluid circuit 104, it may be desirable to size the fluid storage tank 102 based on the larger of the two calculated sizes. In other cases and depending on the application and the particular models of the refrigerant compressor(s), it may be desirable to size it based on the smaller of the two calculated sizes.

In a particular embodiment, the fluid storage tank 102 may be sized to hold about ten gallons of fluid per nominal ton of capacity of the refrigerant compressor module 122. Thus, in the illustrative example above, the fluid storage tank 102 may be sized to hold 120 gallons of the first fluid (12 tons of capacity of the refrigerant compressor module 122 times 10 gallons per ton of capacity of the refrigerant compressor module 122). Accordingly, in that example, the first storage tank 102 may satisfy the first cooling load for about 15 minutes (assuming an 8 gpm consumption of the first fluid to provide the example 4-ton cooling load).

Although HVAC applications of the heat transfer system 100, 200, 600 are described in this document, the heat transfer system 100, 200, 600 may be implemented in a variety of different applications. One example application may be a refrigeration application. Another example application may be a refrigeration application in combination with an HVAC application.

The heat transfer systems 100, 200, 600 described in this document may be useful in some applications requiring the provision of a chilled fluid to satisfy relatively large design (or peak) cooling loads during certain periods of time, and requiring the provision of the chilled fluid to satisfy relatively low part cooling loads during other periods of time. The heat transfer systems 100, 200, 600 may also be useful for some applications requiring the provision of a heated fluid to satisfy relatively large design (or peak) heating loads during certain periods of time, and requiring the provision of the heated fluid to satisfy relatively low part heating loads during other periods of time.

Some non-limiting implementations of the present technology can be represented as presented in the following numbered clauses:

CLAUSE 1. A heat transfer system 100, 200, 600, comprising: a first refrigerant conduit 110, a second refrigerant conduit 116, a refrigerant compressor module 122, and an expansion valve 124, the first refrigerant conduit 110 and the second refrigerant conduit 116 being fluidly interconnected via the refrigerant compressor module 122 and the expansion valve 124 for circulating a refrigerant through the first refrigerant conduit 110 and the second refrigerant conduit 116 by the refrigerant compressor module 122 via the expansion valve 124 for heat exchange between the first refrigerant conduit 110 and the second refrigerant conduit 116; a first fluid storage tank 102 fillable with a first fluid, such as a glycol solution, and being fluidly connectable to a first fluid circuit 104 for circulating the first fluid between the first fluid circuit 104 and the first fluid storage tank 102 for heat exchange between the first fluid circuit 104 and the first fluid; a first heat exchanger 106 that includes a first heat exchange surface 108 and the first refrigerant conduit 110, the first heat exchange surface 108 being in fluid communication with the first fluid when the heat transfer system 100, 200, 600 is in use, the first refrigerant conduit 110 being positioned for heat exchange with the first heat exchange surface 108; and a second heat exchanger 114 that includes a second heat exchange surface 120 that is fluidly connectable to a second fluid circuit 118 for heat exchange with the second fluid circuit 118, the second heat exchanger 114 including the second refrigerant conduit 116, the second refrigerant conduit 116 being positioned for heat exchange with the second heat exchange surface 120.

CLAUSE 2. The heat transfer system 100, 200, 600 of clause 1, wherein the first heat exchanger 106 is disposed inside the first fluid storage tank 102.

CLAUSE 3. The heat transfer system 100, 200, 600 of any one of clauses 1 and 2, further comprising a second fluid storage tank 126 fillable with a second fluid and fluidly connectable to the second fluid circuit 118 for circulating the second fluid between the second fluid circuit 118 and the second fluid storage tank 126 for heat exchange between the second fluid circuit 118 and the second fluid, and the second heat exchange surface 120 being in fluid communication with the second fluid when the heat transfer system 100, 200, 600 is in use for heat exchange with the second fluid.

CLAUSE 4. The heat transfer system 100, 200, 600 of clause 3, wherein the second heat exchanger 114 is disposed inside the second fluid storage tank 126.

CLAUSE 5. The heat transfer system 100, 200, 600 of any one of clauses 3 and 4, wherein the second heat exchanger 114 includes a heat transfer conduit 128 fluidly connectable to a third fluid circuit 130 for circulating a third fluid between the heat transfer conduit 128 and the third fluid circuit 130 for heat exchange between the heat transfer conduit 128 and the third fluid circuit 130 when the heat transfer system 100, 200, 600 is in use, the heat transfer conduit 128 being positioned for heat exchange with the second refrigerant conduit 116.

CLAUSE 6. The heat transfer system 100, 200, 600 of clause 5, wherein the heat transfer conduit 128 is fluidly separated from the second fluid storage tank 126.

CLAUSE 7. The heat transfer system 100, 200, 600 of any one of clauses 5 and 6, further comprising the third fluid circuit 130 and wherein the third fluid circuit 130 includes at least one of a heat sink 202a-202c, 302, 316 and a heat source 204a-204c, 304, 316.

CLAUSE 8. The heat transfer system 100, 200, 600 of any one of clauses 5 to 7, wherein the heat transfer conduit 128 is disposed inside the second refrigerant conduit 116.

CLAUSE 9. The heat transfer system 100, 200, 600 of clause 8, wherein the heat transfer conduit 128 is disposed coaxially with the second refrigerant conduit 116.

CLAUSE 10. The heat transfer system 100, 200, 600 of any one of clauses 5 to 7, wherein the heat transfer conduit 128 is connected along at least a portion of its length to the second refrigerant conduit 116.

CLAUSE 11. The heat transfer system 100, 200, 600 of clause 10, wherein the heat transfer conduit 128 and the second refrigerant conduit 116 are arranged such that a portion of the heat transfer conduit 128 and a portion of the second refrigerant conduit 116 are in contact with the second fluid in the second fluid storage tank 126 when the heat transfer system 100, 200, 600 is in use.

CLAUSE 12. The heat transfer system 100, 200, 600 of any one of clauses 3 to 11, wherein the first fluid storage tank 102 is a chilled fluid storage tank, the second fluid storage tank 126 is a heated fluid storage tank 102, and the refrigerant compressor module 122 in combination with the expansion valve 124 is operable to transfer heat from the chilled fluid storage tank 102 to the heated fluid storage tank 102.

CLAUSE 13. The heat transfer system 100, 200, 600 of any one of clauses 1 to 12, further comprising a base 132 and wherein the refrigerant compressor module 122 and the first fluid storage tank 102 are disposed on the base 132.

CLAUSE 14. The heat transfer system 100, 200, 600 of clause 13, further comprising an enclosure 208 and wherein the refrigerant compressor module 122 and the first fluid storage tank 102 are disposed inside the enclosure 208.

CLAUSE 15. The heat transfer system 100, 200, 600 of any one of clauses 3 to 12, further comprising a base 132 and wherein the refrigerant compressor module 122, the first fluid storage tank 102, and the second fluid storage tank 126 are disposed on the base 132.

CLAUSE 16. The heat transfer system 100, 200, 600 of clause 15, further comprising an enclosure 208 and wherein the refrigerant compressor module 122, the first fluid storage tank 102, and the second fluid storage tank 126 are disposed inside the enclosure 208.

CLAUSE 17. The heat transfer system 100, 200, 600 of any one of clauses 3 to 16, further comprising an expansion tank 134 fluidly connected to the first fluid storage tank 102 so as to absorb expansion of a given volume of the first fluid over a given temperature rise of the first fluid when the heat transfer system 100, 200, 600 is in use.

CLAUSE 18. The heat transfer system 100, 200, 600 of any one of clauses 1 to 17, wherein the first fluid storage tank 102 is sized to satisfy a first cooling load served by the first fluid circuit 104 for a first design period of time during which the refrigerant compressor module 122 is off and during which the first fluid in the first fluid storage tank 102 is within a design temperature range, by supplying the first fluid in the first fluid storage tank 102 to the first fluid circuit 104.

CLAUSE 19. The heat transfer system 100, 200, 600 of clause 18, wherein the design temperature range is a range of temperatures between a first design temperature and a second design temperature that is higher than the first design temperature, the refrigerant compressor module 122 includes at least one refrigerant compressor 122, and the at least one refrigerant compressor 122 is sized to cool substantially all of the first fluid in the first fluid storage tank 102, while the first fluid circuit 104 is off, from the second design temperature to the first design temperature in a second design period of time.

CLAUSE 20. The heat transfer system 100, 200, 600 of clause 19, wherein the first design temperature is between 45 degrees Fahrenheit ("F.") (7.2 degrees C.) and 50 F (10.0 degrees C.), and the second design temperature is between 55 F and 60 F.

CLAUSE 21. The heat transfer system 100, 200, 600 of any one of clause 19 and 20, wherein the second design period of time is at least five minutes.

CLAUSE 22. The heat transfer system 100, 200, 600 of any one of clauses 18 to 21, wherein the first cooling load is in magnitude between 30% and 40% of a design cooling load of the first fluid circuit 104.

CLAUSE 23. The heat transfer system 100, 200, 600 of clause 22, wherein the refrigerant compressor module 122 is sized to continuously satisfy the design cooling load at design operating conditions of the first fluid circuit 104.

CLAUSE 24. The heat transfer system 100, 200, 600 of any one of clauses 1 to 23, wherein the first fluid storage tank 102 is sized in a range of five to fifteen gallons per nominal ton of cooling capacity of the refrigerant compressor module 122.

CLAUSE 25. The heat transfer system 100, 200, 600 of any one of clauses 1 to 24, wherein the refrigerant compressor module 122 comprises a plurality of refrigerant compressors.

CLAUSE 26. The heat transfer system 100, 200, 600 of any one of clauses 19 and 20, wherein the second design period of time is between five minutes and ten minutes.

CLAUSE 27. A hydronic system 201, comprising: a) a first fluid circuit 104, the first fluid circuit 104 containing a first fluid and including: a first pump 104a operable to circulate the first fluid through the first fluid circuit 104, and a chilled fluid coil 204a operable to add heat to the first fluid when the first fluid circulates through the chilled fluid coil 204a; b) a first fluid storage tank 102 being fluidly connected to the first fluid circuit 104 such that the first pump 104a circulates the first fluid through the first fluid storage tank 102 when the first pump 104a operates; c) a first heat exchanger 106 defining a first heat exchange surface 108 and a first refrigerant conduit 110, the first heat exchange surface 108 being in fluid communication with the first fluid storage tank 102, the first refrigerant conduit 110 being fluidly separated from the first fluid circuit 104 and the second fluid circuit 118, the first refrigerant conduit 110 having a first end and a second end; d) a second heat exchanger 114 defining a second heat exchange surface 120 and a second refrigerant conduit 118, the second refrigerant conduit 118 having a first end and a second end, the first end of the second refrigerant conduit 118 being fluidly connected to the first end of the first refrigerant conduit 110 via an expansion valve 124, the second end of the second refrigerant conduit 118 being fluidly connected to the second end of the first refrigerant conduit 110 via a refrigerant compressor 122, the first and second refrigerant conduits 110, 118, the expansion valve 114, and the refrigerant compressor 122 together defining a refrigerant circuit 112, the refrigerant circuit 112 containing a refrigerant, and the refrigerant compressor 122 being operable to circulate the refrigerant through the refrigerant circuit 112 to transfer heat from the first refrigerant conduit 110 to the second refrigerant conduit 118, the first refrigerant conduit 110 receiving heat from the first heat exchange surface 108 at least during operation of the refrigerant compressor 122; and e) a second fluid circuit 118, the second fluid circuit 118 containing a second fluid and including: a second pump 118a operable to circulate the second fluid through the second fluid circuit 118, and a heated fluid coil 202a operable to remove heat from the second fluid when the second fluid circulates through the heated fluid coil 202a, the second heat exchange surface 120 of the second heat exchanger 114 being in fluid communication with the second fluid circuit 118 and transferring heat into the second fluid at least during operation of the refrigerant compressor 122.

CLAUSE 28. The hydronic system of clause 27, further comprising a second fluid storage tank 126 being fluidly connected to the second fluid circuit 118 such that the second pump 118a circulates the second fluid through the second fluid storage tank 126 when the second pump 118a operates, and the second heat exchange surface 120 being in fluid communication with the second fluid storage tank 126.

CLAUSE 29. The hydronic system of clause 28, wherein the second heat exchange surface 120 is disposed inside the second fluid storage tank 126.

CLAUSE 30. The hydronic system of clause 29, further comprising a third fluid circuit 130, and wherein the second heat exchanger 114 defines first fluid conduit 128 that is fluidly connected to the third fluid circuit 130 and is fluidly separated from the second refrigerant conduit 118, the first fluid conduit 128 receiving heat from the second refrigerant conduit 118 at least during operation of the refrigerant compressor 122.

CLAUSE 31. The hydronic system of clause 30, wherein the first fluid conduit 128 contacts the second refrigerant conduit 118.

CLAUSE 32. The hydronic system of clause 30 or 31, wherein the first fluid conduit 128 is disposed at least in part inside the second refrigerant conduit 118.

CLAUSE 33. The hydronic system of clause 32, wherein the first fluid conduit 128 is at least in part coaxial with at least a part of the second refrigerant conduit 118.

CLAUSE 34. The hydronic system of any one of clauses 27 to 33, wherein: the first heat exchanger 106 is disposed outside of the first fluid tank 102 and defines a second fluid conduit 108, the first heat exchange surface 108 being an inner surface of the second fluid conduit 108, and the second fluid conduit 108 is fluidly connected to the first fluid tank 102 via a third pump 121, the third pump 121 being operable to circulate the first fluid through the second fluid conduit 108.

CLAUSE 35. The hydronic system of any one of clauses 27 to 33, wherein: the first heat exchanger 602 is disposed inside of the first fluid tank 102, and the first heat exchange surface 604 is an outer surface of the first refrigerant conduit 604.

The various implementations and applications of the heat transfer system(s) 100, 200, 600 described in this document may be implemented using any piping, valving, pumping, and controls arrangement(s) (which could include known mechanical and/or electrical controls components for example) suitable for each particular implementation, application, and embodiment(s) of the heat transfer system(s) 100, 200, 600. The various embodiments and applications of the example systems and methods described in this document may be implemented using any suitable combination of known materials and electronic controls equipment, including known sensors and electronic controllers. Further, the various embodiments and applications of the example systems and methods described in this document may be implemented using any suitable known manufacturing, assembly, wiring, and programming methods, as applicable to each particular implementation and application.

While particular examples are described above, it will be appreciated that other embodiments, implementations, applications, and methods may be within the scope of the disclosure.

The invention claimed is:

1. A heat transfer system, comprising:
a refrigeration circuit including a first refrigerant conduit, a second refrigerant conduit,
a refrigerant compressor module including at least one refrigerant compressor, and an expansion valve,
the first refrigerant conduit and the second refrigerant conduit being fluidly interconnected via the refrigerant compressor module and the expansion valve for circulating a refrigerant through the first refrigerant conduit and the second refrigerant conduit by the refrigerant compressor module via the expansion valve for heat exchange between the first refrigerant conduit and the second refrigerant conduit;
a first fluid storage tank fillable with a first fluid and being fluidly connectable to a first fluid circuit for circulating the first fluid between the first fluid circuit and the first fluid storage tank for heat exchange between the first fluid circuit and the first fluid;
a second fluid storage tank fillable with a second fluid and fluidly connectable to a second fluid circuit for circulating the second fluid between the second fluid circuit and the second fluid storage tank for heat exchange between the second fluid circuit and the second fluid;
a first heat exchanger that includes a first heat exchange surface and the first refrigerant conduit, the first heat exchange surface being in fluid communication with the first fluid when the heat transfer system is in use, the first refrigerant conduit being positioned for heat exchange with the first heat exchange surface; and
a second heat exchanger disposed inside the second fluid storage tank, the second heat exchanger including a second heat exchange surface that is fluidly connectable to the second fluid circuit for heat exchange with the second fluid circuit, the second heat exchange surface being in fluid communication with the second fluid when the heat transfer system is in use for heat exchange with the second fluid, the second heat exchanger including the second refrigerant conduit, the second heat exchange surface being an external wall of the second refrigerant conduit such that the second refrigerant conduit is positioned for heat exchange with the second fluid in the second fluid storage tank via the second heat exchange surface, the second heat exchanger including a heat transfer conduit fluidly connectable to a third fluid circuit for circulating a third fluid between the heat transfer conduit and the third fluid circuit for heat exchange therebetween when the heat transfer system is in use, the heat transfer conduit being disposed inside the second refrigerant conduit and being connected along at least a portion of its length to the second refrigerant conduit for heat exchange with the second refrigerant conduit;
wherein the second refrigerant conduit, the heat transfer conduit, and the second fluid storage tank are fluidly separated from one another.

2. The heat transfer system of claim 1, wherein the first heat exchanger is disposed inside the first fluid storage tank.

3. The heat transfer system of claim 1, further comprising the third fluid circuit and wherein the third fluid circuit includes at least one of a heat sink and a heat source.

4. The heat transfer system of claim 1, wherein the heat transfer conduit is disposed coaxially with the second refrigerant conduit.

5. The heat transfer system of claim 1, wherein the heat transfer conduit and the second refrigerant conduit are arranged such that a portion of the heat transfer conduit and a portion of the second refrigerant conduit are in contact with the second fluid in the second fluid storage tank when the heat transfer system is in use.

6. The heat transfer system of claim 1, wherein the first fluid storage tank is a chilled fluid storage tank, the second fluid storage tank is a heated fluid storage tank, and the refrigerant compressor module in combination with the expansion valve is operable to transfer heat from the chilled fluid storage tank to the heated fluid storage tank.

7. The heat transfer system of claim 1, wherein:
the first fluid storage tank is sized to satisfy a first non-zero cooling load served by the first fluid circuit for a first design period of time during which the refrigerant compressor module is off and during which the first fluid in the first fluid storage tank is within a design temperature range, by supplying the first fluid in the first fluid storage tank to the first fluid circuit;
the design temperature range is a range of temperatures between a first design temperature and a second design temperature that is higher than the first design temperature;

the at least one refrigerant compressor is sized to cool the first fluid in the first fluid storage tank, while the first fluid circuit is off, from the second design temperature to the first design temperature in a second design period of time;

the first design temperature is between 45 degrees Fahrenheit ("F") (7.2 degrees Celcius ("C")) and 50F (10.0 degrees C.); and the second design temperature is between 55F (12.8 degrees C.) and 60F (15.6 degrees C.).

8. The heat transfer system of claim 7, wherein the first cooling load is in magnitude between 30% and 40% of a design cooling load of the first fluid circuit.

9. The heat transfer system of claim 8, wherein the at least one refrigerant compressor is sized to continuously satisfy the design cooling load at design operating conditions of the first fluid circuit.

10. The heat transfer system of claim 7, wherein the second design period of time is between five minutes and ten minutes.

11. The heat transfer system of claim 1, wherein the first fluid storage tank is sized in a range of five to fifteen gallons per nominal ton of cooling capacity of the refrigerant compressor module.

12. A hydronic system, comprising:
a) a first fluid circuit containing a first fluid and including:
a first pump operable to circulate the first fluid through the first fluid circuit, and
a chilled fluid coil operable to add heat to the first fluid when the first fluid circulates through the chilled fluid coil;
b) a first fluid storage tank being fluidly connected to the first fluid circuit such that the first pump circulates the first fluid through the first fluid storage tank when the first pump operates;
c) a first heat exchanger defining a first heat exchange surface and a first refrigerant conduit, the first heat exchange surface being in fluid communication with the first fluid storage tank, the first refrigerant conduit being fluidly separated from the first fluid circuit, the first refrigerant conduit having a first end and a second end;
d) a second heat exchanger defining a second heat exchange surface and a second refrigerant conduit, the second refrigerant conduit having a first end and a second end,
the first end of the second refrigerant conduit being fluidly connected to the first end of the first refrigerant conduit via an expansion valve,
the second end of the second refrigerant conduit being fluidly connected to the second end of the first refrigerant conduit via a refrigerant compressor,
the first and second refrigerant conduits, the expansion valve, and the refrigerant compressor together defining a refrigerant circuit,
the refrigerant circuit containing a refrigerant, and
the refrigerant compressor being operable to circulate the refrigerant through the refrigerant circuit to transfer heat from the first refrigerant conduit to the second refrigerant conduit, the first refrigerant conduit receiving heat from the first heat exchange surface at least during operation of the refrigerant compressor;
e) a second fluid circuit containing a second fluid, the second refrigerant conduit being fluidly separated from the second fluid circuit, the second fluid circuit including:
a second pump operable to circulate the second fluid through the second fluid circuit, and
a heated fluid coil operable to remove heat from the second fluid when the second fluid circulates through the heated fluid coil, the second heat exchange surface of the second heat exchanger being in fluid communication with the second fluid circuit and transferring heat into the second fluid at least during operation of the refrigerant compressor;
(f) a second fluid storage tank fluidly connected to the second fluid circuit such that the second pump circulates the second fluid through the second fluid storage tank when the second pump operates, the second heat exchanger being disposed inside the second fluid storage tank, the second heat exchange surface being in fluid communication with the second fluid storage tank, the second heat exchange surface being disposed inside the second fluid storage tank, the second heat exchange surface being an external wall of the second refrigerant conduit such that the second refrigerant conduit is positioned for heat exchange with the second fluid in the second fluid storage tank via the second heat exchange surface; and
(g) a third fluid circuit containing a third fluid, the second heat exchanger defining a first fluid conduit that is fluidly connected to the third fluid circuit and is fluidly separated from the second refrigerant conduit, the first fluid conduit receiving heat from the second refrigerant conduit at least during operation of the refrigerant compressor, the first fluid conduit being disposed at least in part inside the second refrigerant conduit, the second refrigerant conduit, the first fluid conduit, and the second fluid storage tank being fluidly separated from one another.

13. The hydronic system of claim 12, wherein the first fluid conduit contacts the second refrigerant conduit.

14. The hydronic system of claim 12, wherein the first fluid conduit is at least in part coaxial with at least a part of the second refrigerant conduit.

15. The hydronic system of claim 12, wherein:
the first heat exchanger is disposed outside of the first fluid tank and defines a second fluid conduit, the first heat exchange surface being an inner surface of the second fluid conduit, and
the second fluid conduit is fluidly connected to the first fluid tank via a third pump, the third pump being operable to circulate the first fluid through the second fluid conduit.

16. The hydronic system of claim 12, wherein:
the first heat exchanger is disposed inside of the first fluid tank, and
the first heat exchange surface is an outer surface of the first refrigerant conduit.

* * * * *